United States Patent
Kobayashi (10) Patent No.: US 7,271,360 B2
(45) Date of Patent: Sep. 18, 2007

(54) KEY BUTTON STRUCTURE AND PORTABLE TERMINAL DEVICE THEREWITH

(75) Inventor: Fumiyuki Kobayashi, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/200,085

(22) Filed: Aug. 10, 2005

(65) Prior Publication Data
US 2006/0037848 A1 Feb. 23, 2006

(30) Foreign Application Priority Data
Aug. 17, 2004 (JP) ............................. 2004-237766

(51) Int. Cl.
*H01H 9/00* (2006.01)
(52) U.S. Cl. ...................... 200/314; 200/313
(58) Field of Classification Search ................ 200/314
See application file for complete search history.

(56) References Cited

U.S. PATENT DOCUMENTS

| | | | |
|---|---|---|---|
| 5,408,060 A * | 4/1995 | Muurinen .................... | 200/314 |
| 6,373,008 B1 * | 4/2002 | Saito et al. .................. | 200/310 |
| 6,761,462 B2 * | 7/2004 | Yoshida ....................... | 362/109 |
| 6,797,902 B2 * | 9/2004 | Farage et al. ................ | 200/314 |
| 6,803,903 B1 * | 10/2004 | Ostergård et al. ........... | 345/168 |
| 2005/0073446 A1 * | 4/2005 | Lazaridis et al. ............. | 341/22 |

FOREIGN PATENT DOCUMENTS

| | | |
|---|---|---|
| EP | 0 508 563 A1 | 1/1992 |
| EP | 1 139 639 A2 | 3/2001 |
| EP | 1 523 021 A1 | 10/2003 |
| EP | 1 542 437 A2 | 12/2004 |
| JP | 2001-006479 | 1/2001 |
| JP | 2002-320005 | 10/2002 |
| WO | WO98/01876 | 1/1998 |
| WO | WO 02-15211 A1 | 2/2002 |
| WO | WO 03-017080 A2 | 2/2003 |

OTHER PUBLICATIONS

Patent Abstracts of Japan, vol. 15:410, Oct. 18, 1991 & JP 03 164922 A (Canon Inc.), abstract only.

* cited by examiner

*Primary Examiner*—Elvin Enad
*Assistant Examiner*—Lheiren Mae A. Anglo
(74) *Attorney, Agent, or Firm*—Foley & Lardner LLP (57) ABSTRACT

The present invention provides a key button structure, capable of easily and positively finding a targeted character in accordance with an entry mode preset by a user, comprises: a key top; a light shielding section, which is attached onto rear face of the key top and of which is formed by reversely printing characters assigned to a key button for each character type display area; key backlights, each of which is provided in a dome anchoring sheet for covering a metal dome, and are arranged so as to be divided into three types: key backlights for lighting a numeral display area, a kana character display area, and an alphabetical letter display area respectively. For example, with a numeral entry mode preset, only the key backlight for lighting the numeral display area is lighted, thus displaying only a required numeral bright in the number entry mode.

5 Claims, 13 Drawing Sheets

| | | |
|---|---|---|
| 1 あ | 2 か ABC | 3 さ DEF |
| 4 た GHI | 5 な JKL | 6 は MNO |
| 7 ま PQRS | 8 や TUV | 9 ら WXYZ |
| * http// DRIVE | 0 わを んー | # ゛゜ MANNER |

EXAMPLE OF DISPLAY IN NUMERAL ENTRY MODE

FIG. 6B

EXAMPLE OF DISPLAY IN KANA CHARACTER ENTRY MODE

FIG. 6C

EXAMPLE OF DISPLAY IN ALPHABETICAL LETTER ENTRY MODE

| | | |
|---|---|---|
| 1 あ | 2 か ABC | 3 さ DEF |
| 4 た GHI | 5 な JKL | 6 は MNO |
| 7 ま PQRS | 8 や TUV | 9 ら WXYZ |
| ∗ http// DRIVE | 0 わを んー | # 、、。 MANNER |

| 1 あ | 2 か ABC | 3 さ DEF |
| 4 た GHI | 5 な JKL | 6 は MNO |
| 7 ま PQRS | 8 や TUV | 9 ら WXYZ |
| ∗ http// DRIVE | 0 わを ん— | # 、、。 MANNER |

KEY BUTTON STRUCTURE AND PORTABLE TERMINAL DEVICE THEREWITH

BACKGROUND OF THE INVENTION

1. Field of the Invention

The present invention relates to a key button structure applied to a portable terminal device such as a mobile phone, PHS (Personal Handyphone System), PDA (Personal Data Assistance, Personal Digital Assistants: Personal Portable Information Communication Device), and more particularly to a key button structure for displaying a plurality of characters assigned to respective key buttons and a portable terminal device therewith.

2. Description of the Prior Art

A recent mobile phone includes a telephone book function and a mail function, where characters such as numerals, kana characters and alphabetical letters are often entered by operating key buttons.

Such a mobile phone has restrictions on size and weight, which limits spaces of a key operation section and number of key buttons. Accordingly, a plurality of types of characters such as numerals, kana characters and alphabetical letters are assigned to one key button.

Figure 13:
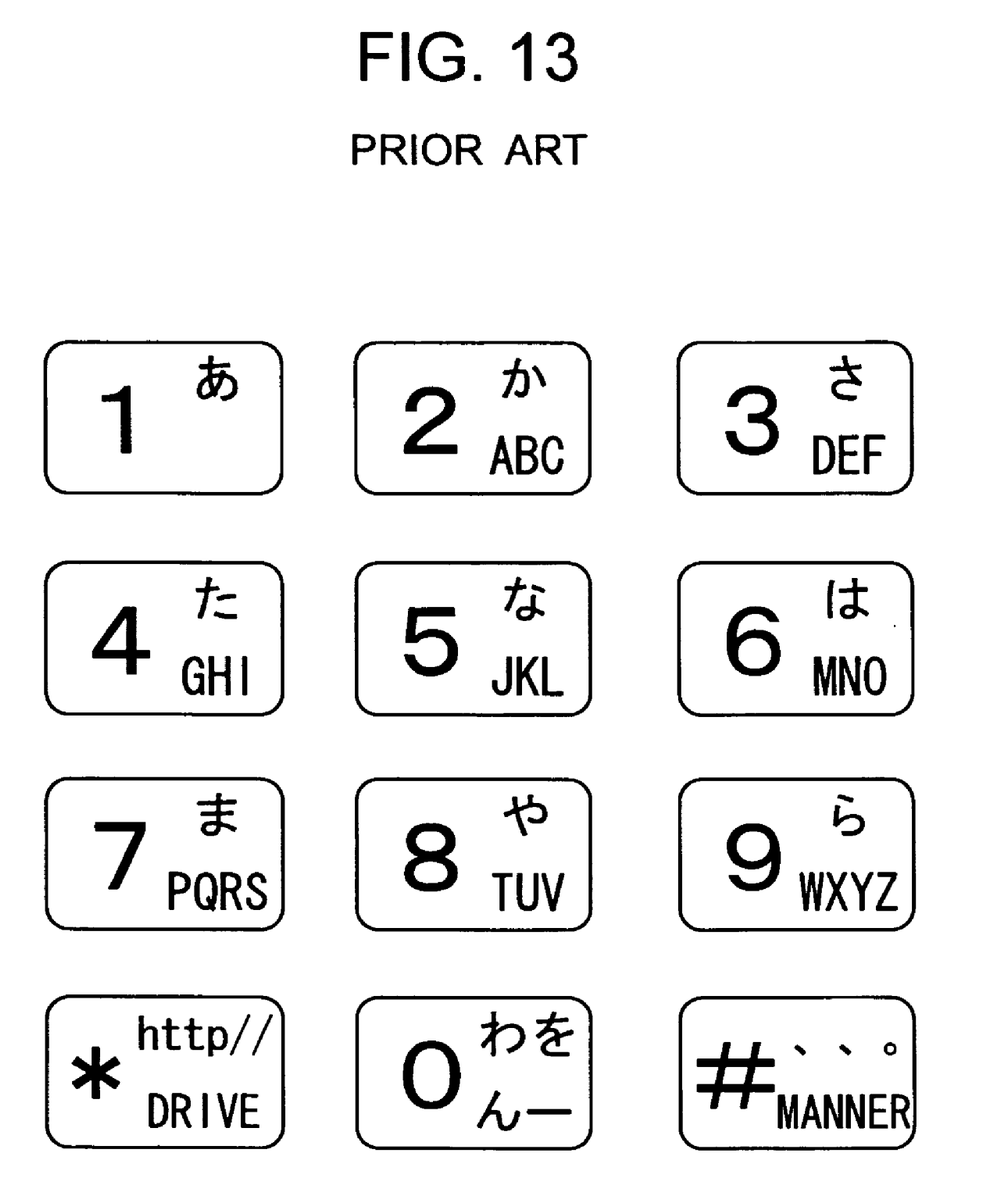
FIG. 13 is a view illustrating a conventional layout example of a ten-key in a key operation section.

FIG. 13 is a view illustrating an example of a conventional plurality of types of characters assigned to a ten-key and symbol keys of the key operation section.

A plurality of types of characters such as numerals, kana characters and alphabetical letters are respectively assigned to respective key button of a ten-key.

For a user to enter characters, a character indicated on a key button is visibly verified, and a key button corresponding to a desired character is looked for and depressed in accordance with an entry mode. However, it is necessary to visibly verify a desired character and select a key corresponding to the character from respective keys assigned with a plurality of types of characters, and indicated characters are difficult to visibly verify. Accordingly, entry speed lowers or an erroneous entry occurs.

To improve the visibility of a displayed character on a key button, Japanese Patent Laid-Open Publication No. 2001-6479 (Patent Document 1) discloses a switch button capable of improving the visibility by forming characters such as numerals and kana characters into a recessed shape on a rear face of a button main-body constituted of a transparent material and coloring the recessed portion so that the displayed characters may look three-dimensional by the lighting from the rear face.

Japanese Patent Laid-Open Publication No. 2002-320005 (Patent Document 2) discloses a key structure for portable terminal equipment capable of enlarging display areas and display sizes for high visibility by indicating a kana character and alphabetical letters on the front side of a transparent key body having a prescribed thickness and indicating a numeral on the rear side of the key body.

The switch button disclosed in Patent Document 1 makes it easy to see characters because the characters such as numerals and kana characters formed in a recessed pattern are displayed in three dimensions, however, concurrently displays the plurality of characters such as numerals and kana characters formed in a recessed pattern. In selecting a targeted character in accordance with an entry mode, characters other than the character to be entered are also displayed. This inhibits a targeted character from being looked for, thus speedy entry becomes difficult, and an erroneous entry is apt to occur.

The key structure for portable terminal equipment disclosed in Patent Document 2 makes it easy to see characters because a targeted character is enlarged and displayed on both faces of the front and side of a key body, however, the characters indicated respectively on both faces of the front and side of the key body are overlapped by each other so as to be invisible. In selecting a targeted character in accordance with an entry mode, characters other than the character to be entered are also displayed. This inhibits a targeted character from being looked for, thus speedy entry becomes difficult, and an erroneous entry is apt to occur.

For example, in making an entry in kana entry mode, a targeted kana character looks overlapped with alphabetical letters or a numeral other than a kana character assigned to a key button, therefore the kana character is not easy to look for. This lowers entry speed and frequently causes erroneous entries.

BRIEF SUMMARY OF THE INVENTION

Accordingly, it is an object of the present invention to provide a key button structure capable of improving visibility for high entry speed and prevention of erroneous entries by displaying a targeted character in accordance with an entry mode so as to find the character easily and positively.

It is another object of the present invention to provide a key button structure capable of improving the visibility of a key button for high entry speed and prevention of erroneous entries by displaying a targeted character in accordance with an entry mode so as to find the character easily and positively.

To achieve the aforementioned object, a key button structure of the present invention, serving as a key button structure for a portable terminal device in which a plurality of types of characters such as numerals, kana characters and alphabetical letters are respectively assigned to a key button, comprises: a key top made of transparent material on which characters assigned to a key button are printed for each character type; and key backlights lighting characters printed on the key top for each character type from the back side, wherein the key backlights are formed so that each of display areas for the characters printed for each character type may be individually lighted up.

Preferably, the key top has light shielding sections on which characters to be printed for each character type are reversely-printed.

The light shielding section may be formed on the front face or rear face of the key top.

According to this embodiment, the key backlights are subjected to lighting control in accordance with an entry mode preset by a user.

Preferably, the respective backlights perform lighting in a different color for each character display area.

According to another aspect of the present invention, there is provided a key button structure for a portable terminal device in which a plurality of types of characters such as numerals, kana characters and alphabetical letters are respectively assigned to a key button, wherein the key button structure comprises: a key top made of transparent material depressed by a user; a light shielding section formed by reversely printing a character assigned to a key button for each character type on a face of a key top; an elastic metal dome brought into contact with a contact point formed on a printed circuit board by depressing a key top; an elastic dome anchoring sheet made of transparent material for anchoring the metal dome so as to cover the dome; and key backlights disposed in the dome anchoring sheet and individually lighting each of character display areas for each character type of the light shielding section.

The respective key backlight is subjected to lighting control in accordance with a preset entry mode.

Preferably, the respective key backlight performs lighting in a different color for each character display area.

According to a further aspect of the present invention, there is provided a portable terminal device equipped with a key button structure in which a plurality of types of characters such as numerals, kana characters and alphabetical letters are respectively assigned to a key button, wherein the key button structure comprises:

a key top made of transparent material on which characters assigned to a key button are printed for each character type; and key backlights individually lighting each of character type areas for characters printed on the key top for each character type from the back side.

The respective key backlight is subjected to lighting control in accordance with a preset entry mode.

Preferably, the respective key backlight performs lighting in a different color for each character type area.

According to the present invention, by disposing key backlights which individually light each of character display areas in which a plurality of types of characters such as numerals, kana characters and alphabetical letters assigned to each of key buttons are displayed for each character type, the key backlight is lighted in accordance with a preset entry mode to display only a required character in the preset entry mode, so that a user can find a targeted character easily and positively, thus increasing entry speed and preventing generation of erroneous entries.

BRIEF DESCRIPTION OF THE DRAWINGS

The present invention is now described with reference to the drawings.

FIG. 11 is a view illustrating a displayed character in a ten-key in an alphabet entry mode according to one embodiment of the present invention;

DETAILED DESCRIPTION OF THE PREFERRED EMBODIMENTS

Figure 1:
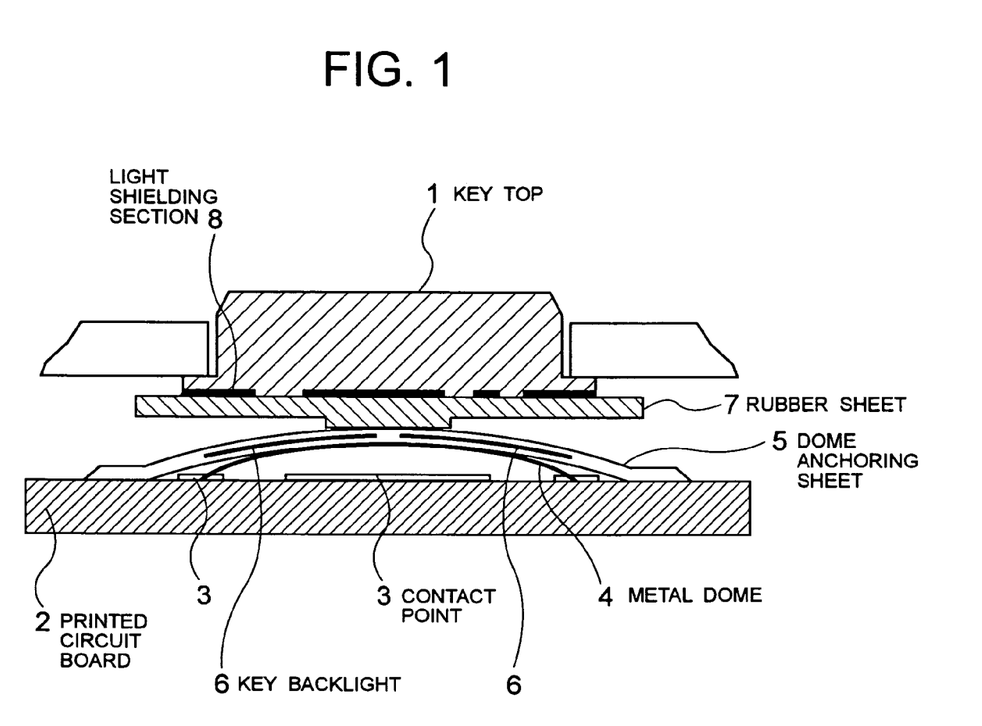
FIG. 1 is a sectional view illustrating a structure of a key button of a mobile phone according to a first embodiment of the present invention.

FIG. 1 is a sectional view illustrating a structure of a key button of a mobile phone according to a first embodiment of the present invention.

In FIG. 1, the key button comprises: a key top 1 made of translucent material, protruding from a face of a case of a mobile phone and depressed by a user; contact points 3 formed on a printed circuit board 2; an elastic metal dome 4 positioned above the contact points 3 and electrically connecting a section between the contact points in response to a depressing motion; an elastic dome anchoring sheet 5 made of translucent material for anchoring the metal dome 4 so as to cover the dome; key backlights 6 positioned in the dome anchoring sheet 5; and a rubber sheet 7 positioned on the rear side of the key top 1, formed with a protrusion (a presser section) for depressing the central portion of the dome anchoring sheet 5 and made of translucent material.

On the rear face of the key top 1, there is provided the light shielding section 8 formed by reversely printing characters assigned to the key button.

Figure 2:
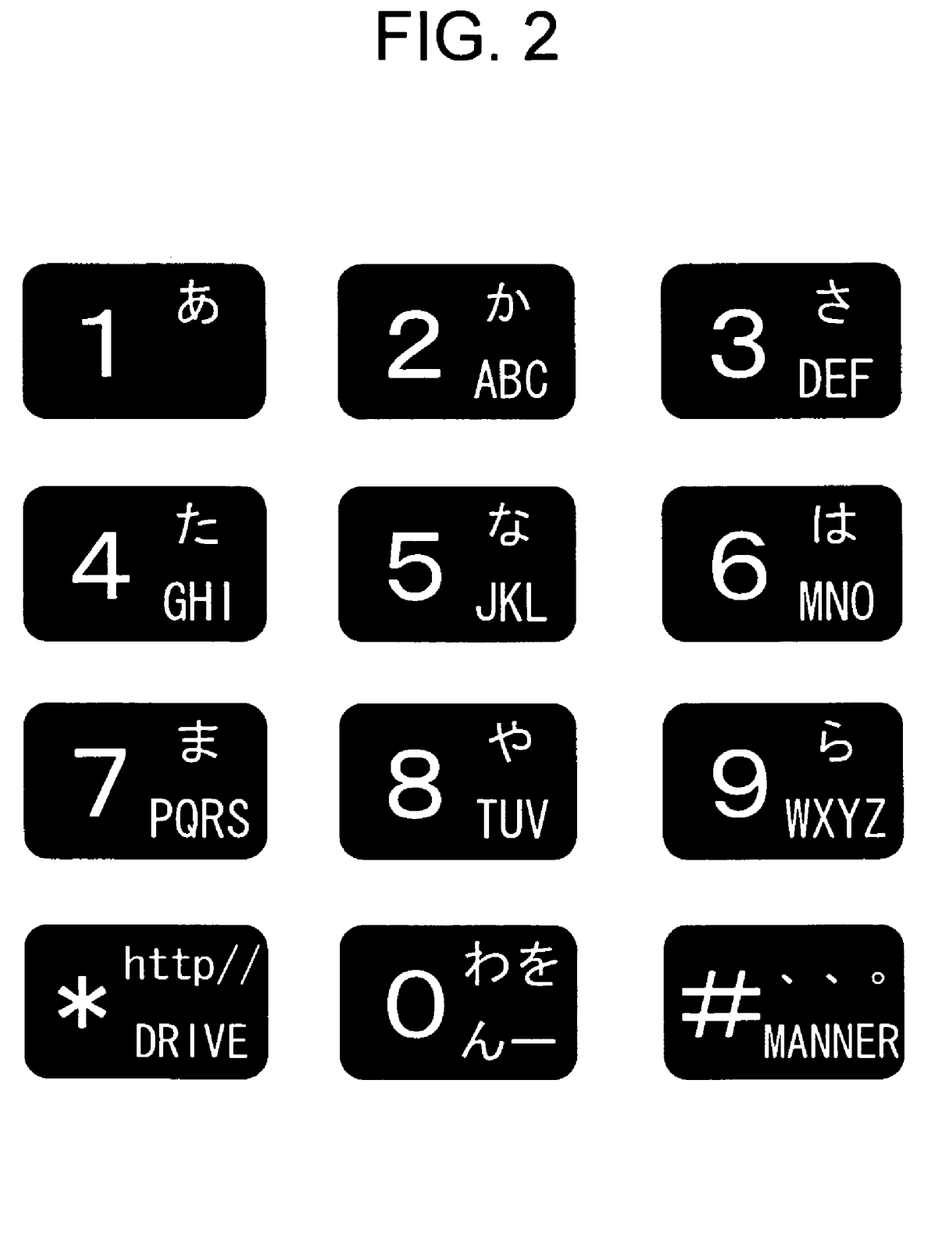
FIG. 2 is a view illustrating an example of a light shielding section 8 formed in each key button of a ten-key according to one embodiment of the present invention.

FIG. 2 is a view illustrating an example when viewed from the surface of a mobile phone with backlights irradiating the type of respective characters in the light shielding section 8 printed on each of the key tops of the ten-key and the symbol key.

A character display area is provided for each character type of characters such as numerals, kana characters and alphabetical letters. Namely, numerals (1, 2, 3, 4, 5, 6, 7, 8, 9, 0) in the case of a ten-key, and symbols (*, #) in the case of symbol keys are arranged in a display area on the left side of the light shielding section. Kana characters are arranged at the right upper section of the numerals 1 to 9 and at the right upper section and the right lower section of a numeral 0.

Reverse printing is performed so that portions with characters assigned to respective key buttons may pass light and the other portions without characters may cut off light.

Each of the key backlights 6 is, for example, a thin-film EL (electroluminescence) and lights a character display area of the light shielding section 8 positioned on the rear face of the key top 1 from the back side.

Moreover, the key backlight 6 is disposed, being divided into three: a key backlight 6-1 which lights a numeral display area, a key backlight 6-2 which lights a kana display area and a key backlight 6-3 which lights an alphabet display area so as to independently light each of the character display areas of the light shielding section 8, as described later.

The light shielding section 8 receives light from the key backlight for each character display area, so that the light passing through a reversely printed character portion makes a character allotted to a key button look bright for each character type.

Figure 3:
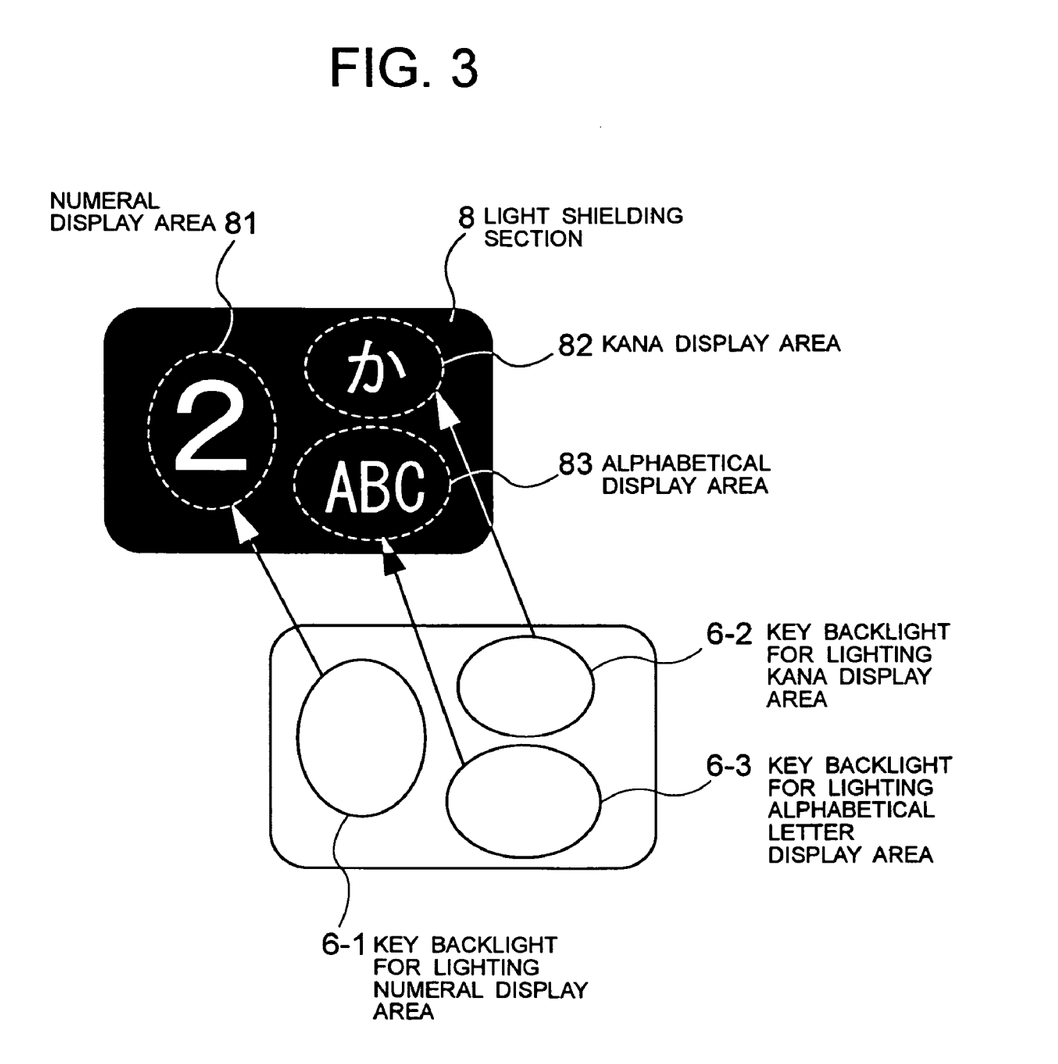
FIG. 3 is a view illustrating a positional relationship of character display areas of a light shielding section 8 with respective key backlights.

FIG. 3 is a view illustrating a positional relationship of character display areas of a light shielding section 8 with respective key backlights 6.

Referring to FIG. 3, there is illustrated an example of the light shielding section 8 of the key button to which a numeral "2", a kana letter "か (ka)", and alphabetical letters "ABC" are assigned respectively, and correspondence among the backlight 6-1 for lighting a numeral display area, the backlight 6-2 for lighting a kana character display area, and the backlight 6-3 for lighting an alphabet display area, which light the respective areas. These display areas receive lighting of the individual backlights respectively.

Figure 4:
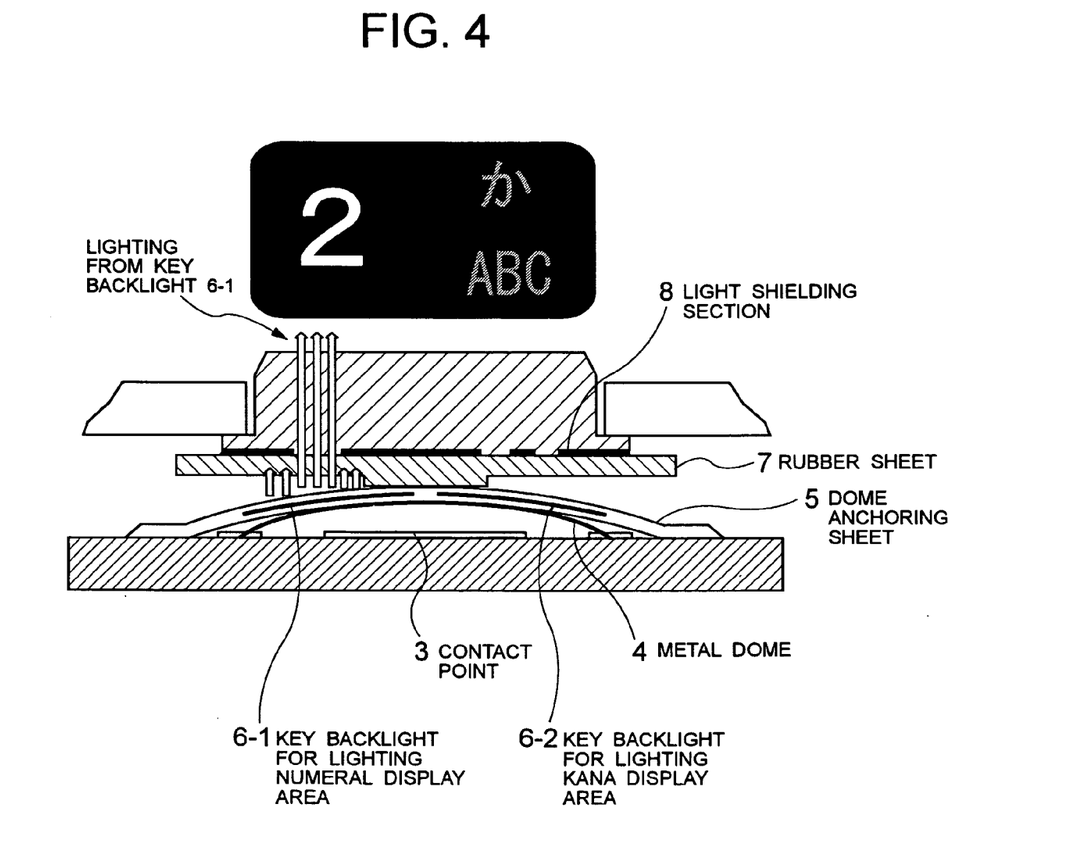
FIG. 4 is a view illustrating a relationship between display of a key button and lighting of a backlight according to one embodiment of the present invention, and illustrating a state in which a key backlight 6-1 for lighting a display area of a numeral "2" is lighted and a state in which the numeral "2" is lighted bright at that time.

If the key backlight 6-1 n for lighting the numeral display area 81 of the light shielding section 8 is lighted, only a numeral "2" can be displayed bright. FIG. 4 is a view illustrating a state in which only a key backlight 6-1 for lighting a display area of a numeral "2" is lighted and a state in which the numeral "2" is lighted bright at that time.

Figure 5:
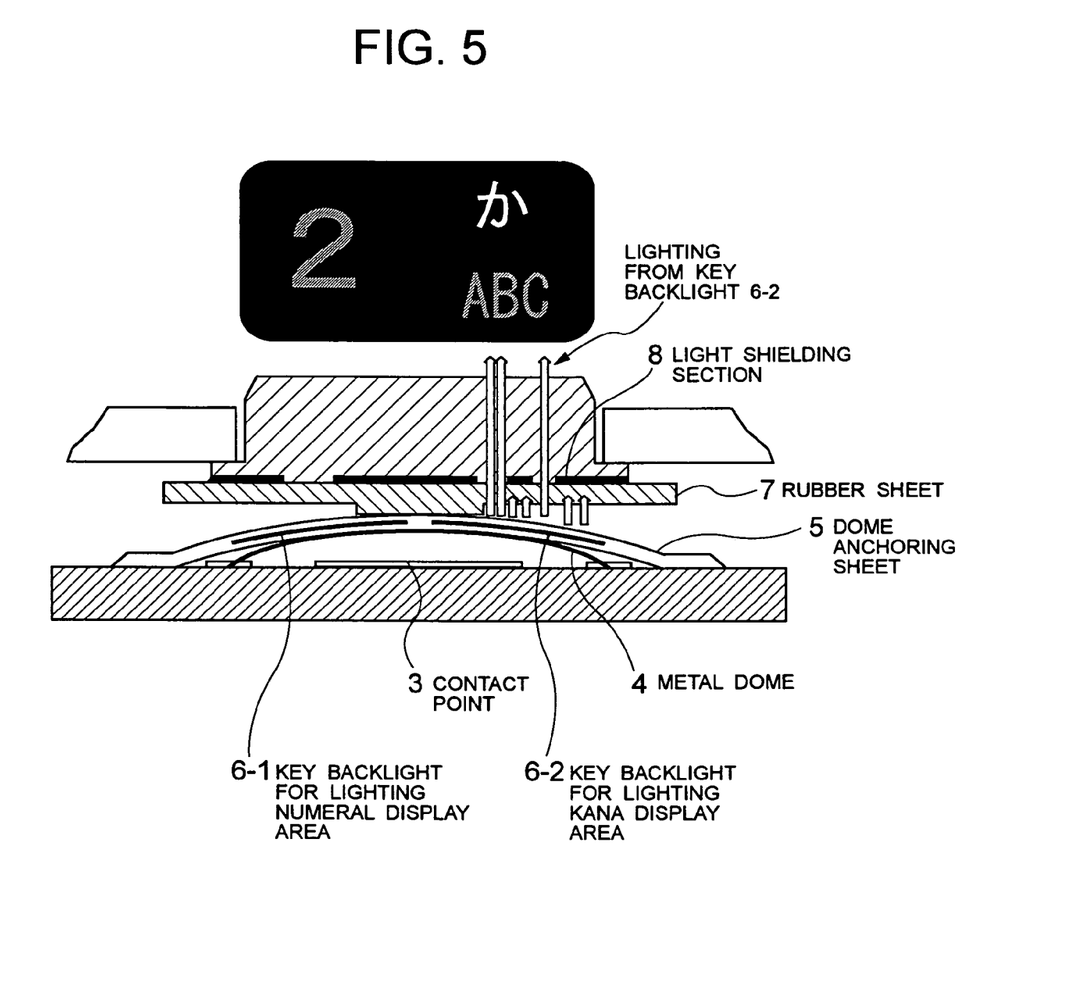
FIG. 5 is a view illustrating a relationship between display of a key button and lighting of a backlight according to one embodiment of the present invention, a state in which a key backlight 6-2 for lighting a display area of a Japanese kana character "か (ka)" is lighted, and a state in which the kana character "か (ka)" is displayed bright at that time.

Likewise, referring to FIG. 5, there is illustrated a state in which the key backlight 6-2 for lighting the kana character display area 82 is lighted and only a kana character "か (ka)" is displayed bright. Likewise, if the key backlight 6-3 for lighting an alphabet display area is lighted, only an alphabetical group "ABC" can be displayed bright.

Figure 6A:
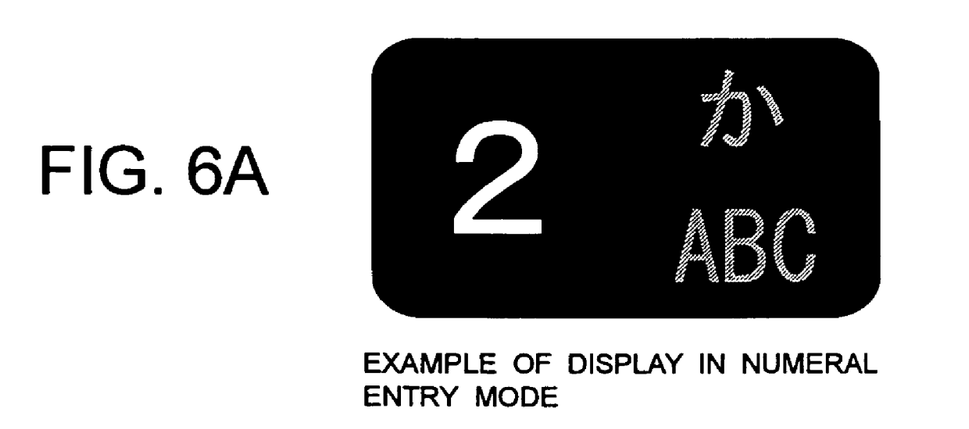
FIGS. 6A, 6B and 6C are views illustrating display examples of the brightness of each of characters in a numeral entry mode, a kana character entry mode and an alphabet entry mode for one key button according to one embodiment of the present invention.
Figure 6B:
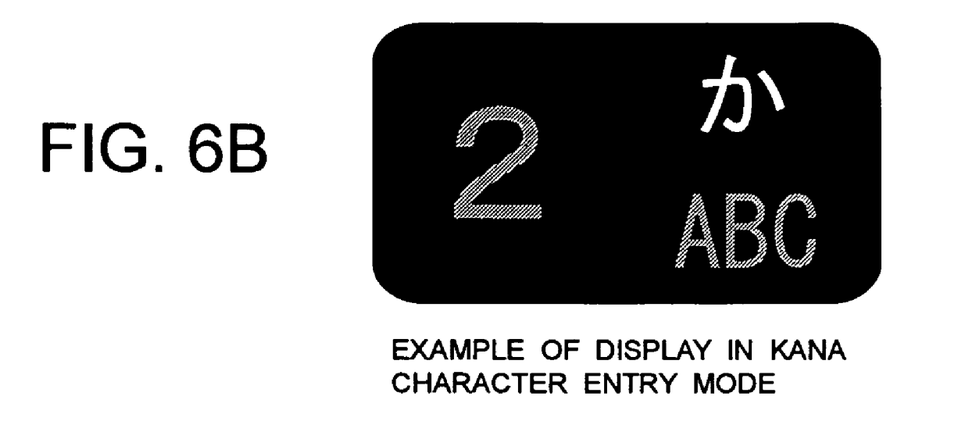
Figure 6C:
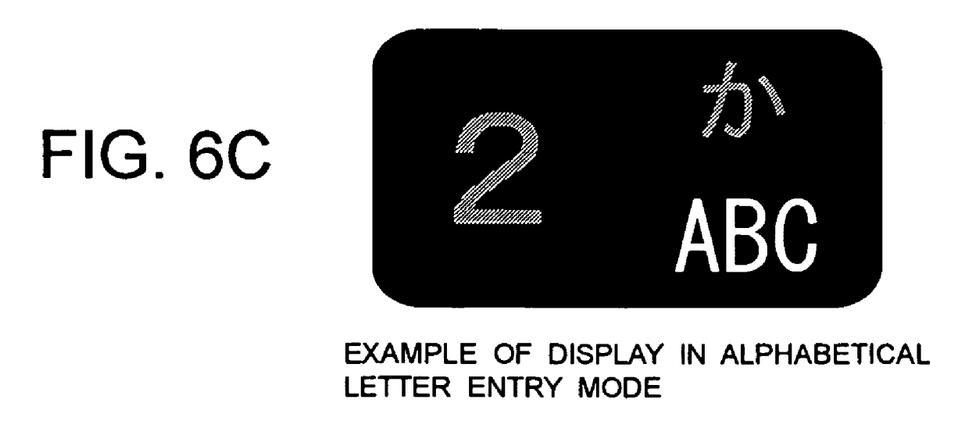

Referring to FIGS. 6A to 6C, there are illustrated differences in brightness among views in a numeral entry mode (FIG. 6A), a kana entry mode (FIG. 6B), and an alphabet entry mode (FIG. 6C) respectively. Lighting of the key backlights 6-1, 6-2, and 6-3 is controlled in accordance with an entry mode.

Figure 7:
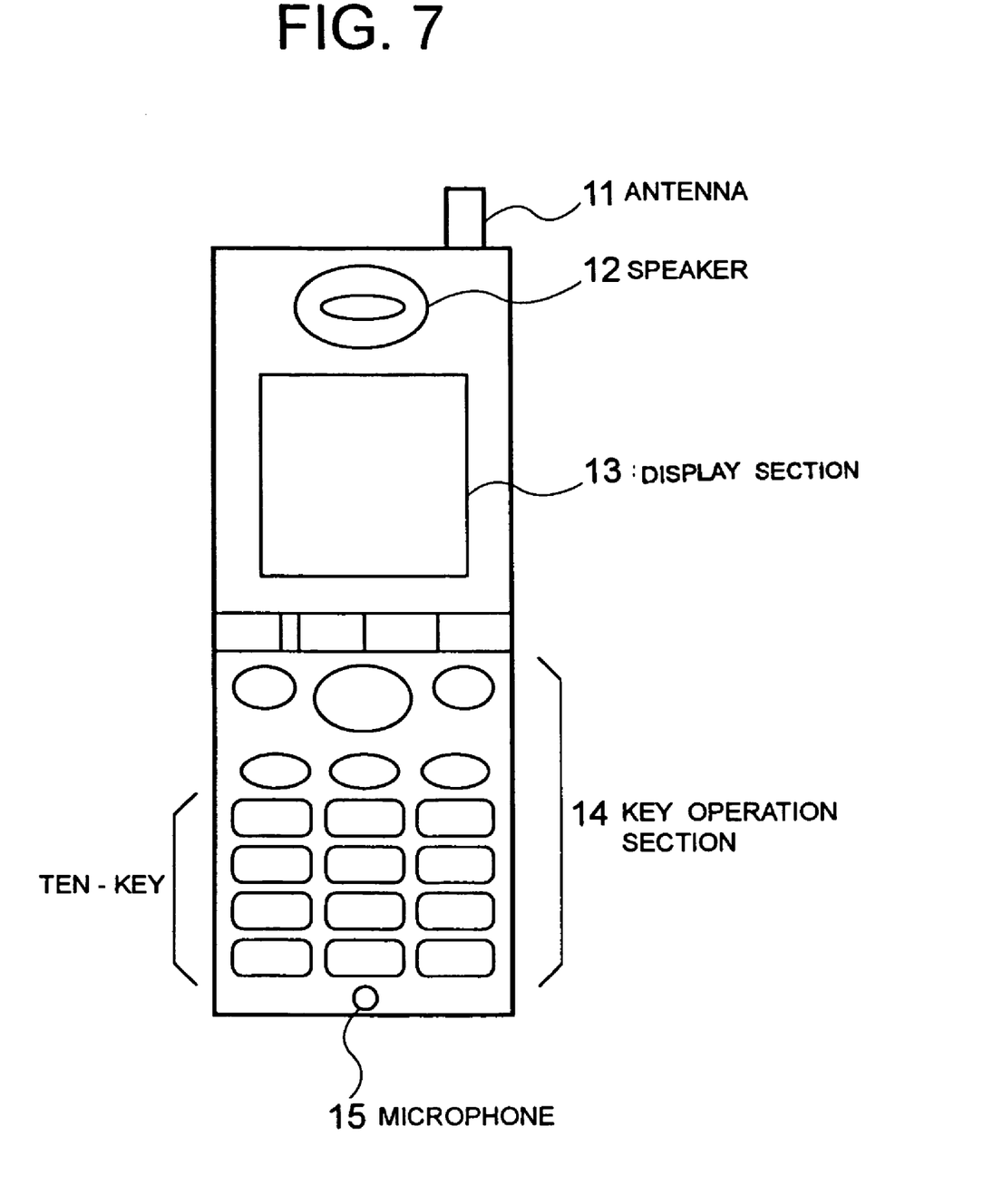
FIG. 7 is a front view illustrating an example of a mobile phone using a key button structure according to a first embodiment of the present invention.

FIG. 7 is a front view illustrating an example of a mobile phone using a key button structure according to the present invention. On one side of a foldable case of a mobile phone, there are disposed an antenna 11, a speaker 12 making a sound, and a display section 13 for displaying various types of data. On the other side of the foldable mobile phone, there are disposed a key operation section 14 operated by a user, and a microphone 15. The key button is used for ten-key in a key operation section 14 and symbol keys.

Figure 8:
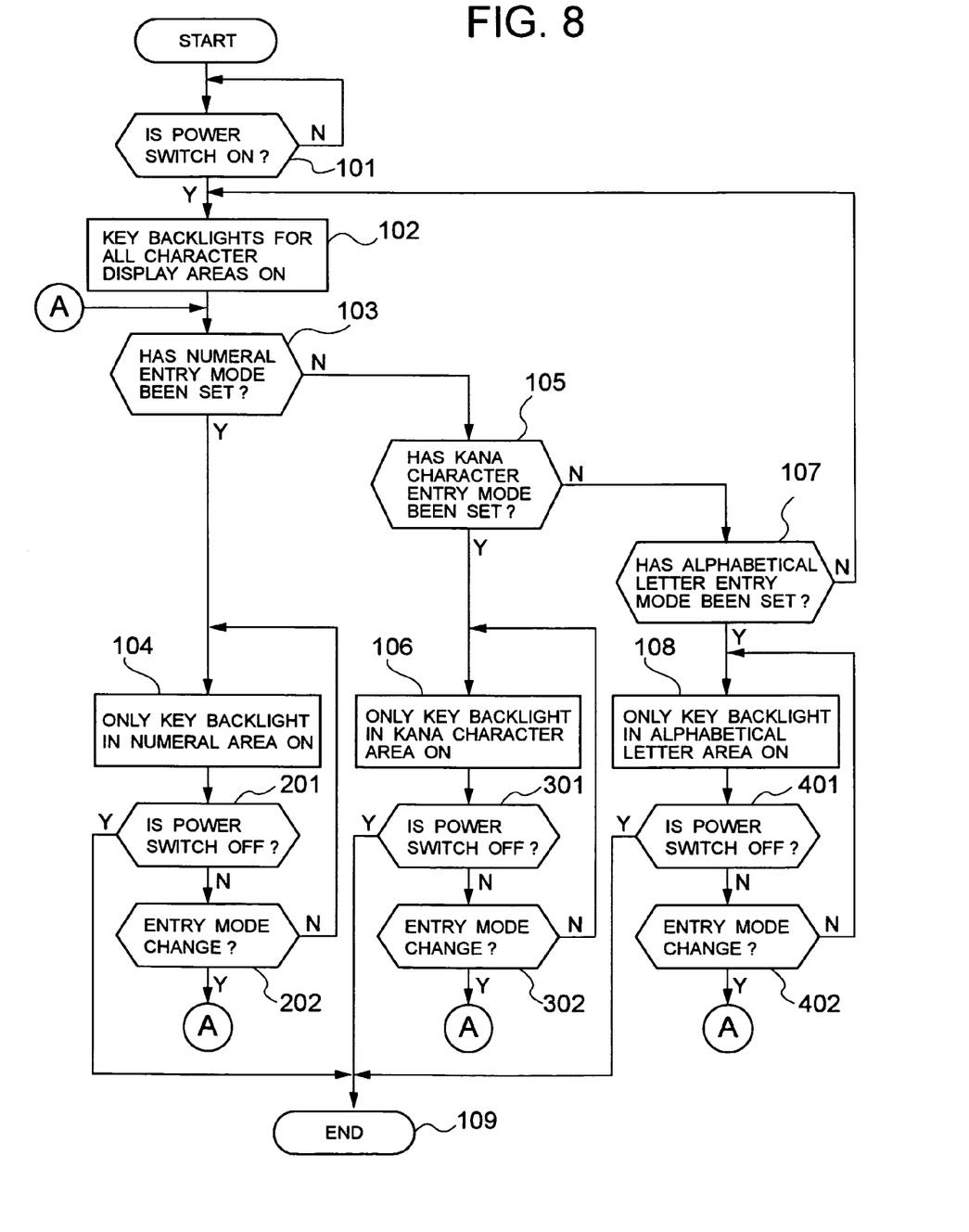
FIG. 8 is a flow chart illustrating lighting control of a key backlight according to one embodiment of the present invention.

FIG. 8 is a flow chart illustrating lighting control of key backlights 6-1, 6-2, 6-3. The lighting control is performed in accordance with function keys which select entry mode of the input operation section or a power switch by a control section not illustrated here.

Referring to FIG. 8, in the initial state in which a user turns on a power switch of a mobile phone (step 101), key backlights for all character display areas of the light shielding section 8 are lighted (step 102). That is, the key backlight 6-1 for lighting the numeral display area, the key backlight 6-2 for lighting the kana display area, and the key backlight 6-3 for lighting the alphabet display area are lighted.

Figure 9:
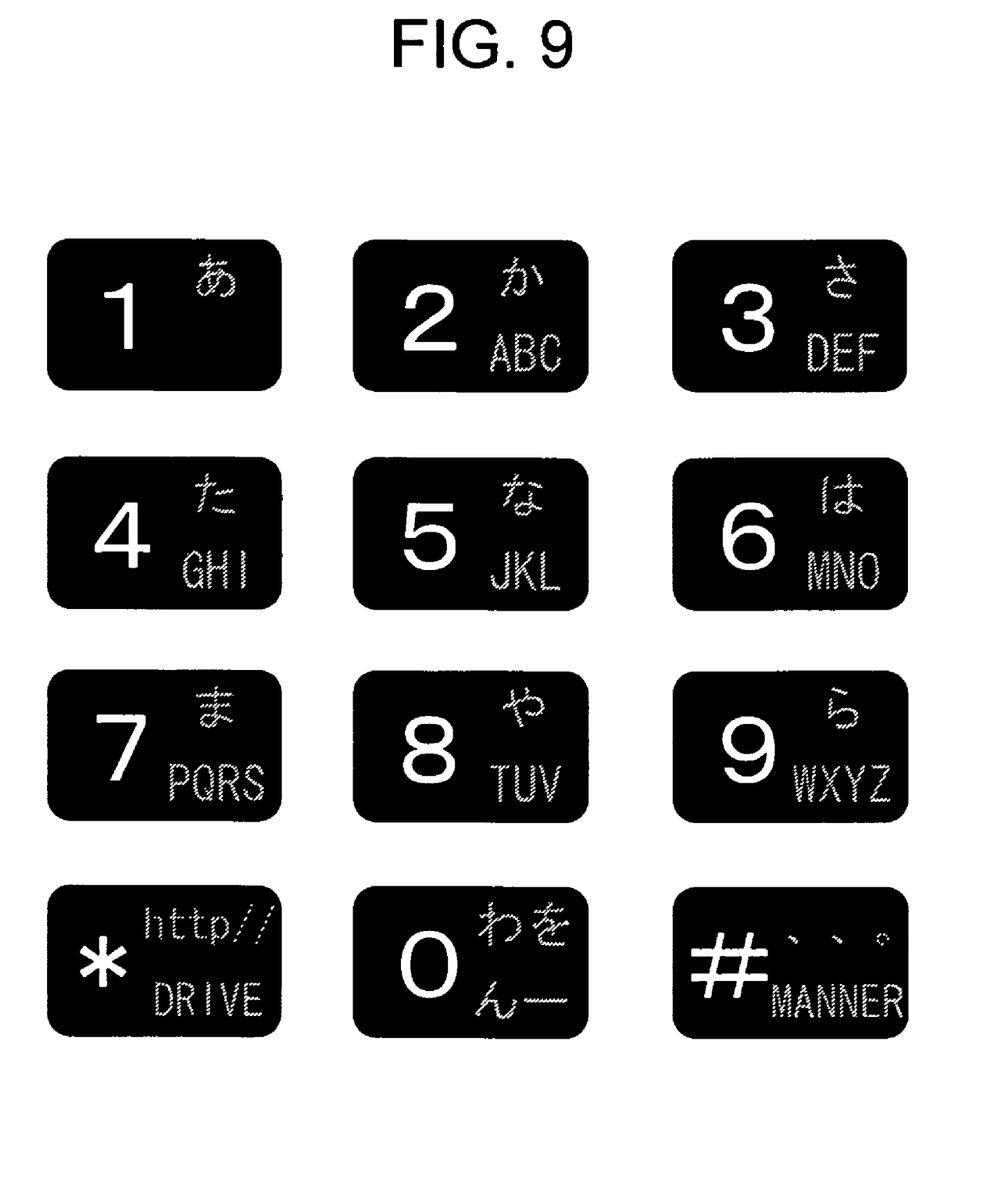
FIG. 9 is a view illustrating a displayed character in a ten-key in a numeral entry mode according to one embodiment of the present invention.

Then, if the user sets a numeral entry mode (step 103), only the key backlight 6-1 for lighting the numeral display area of the light shielding section 8 is lighted, and the key backlights 6-2 and 6-3 for lighting an kana display area and an alphabet display area go off (step 104). In this case, as illustrated in FIG. 9, only the numeral display area is lighted, and a character required in a numeral entry mode is markedly displayed bright.

Figure 10:
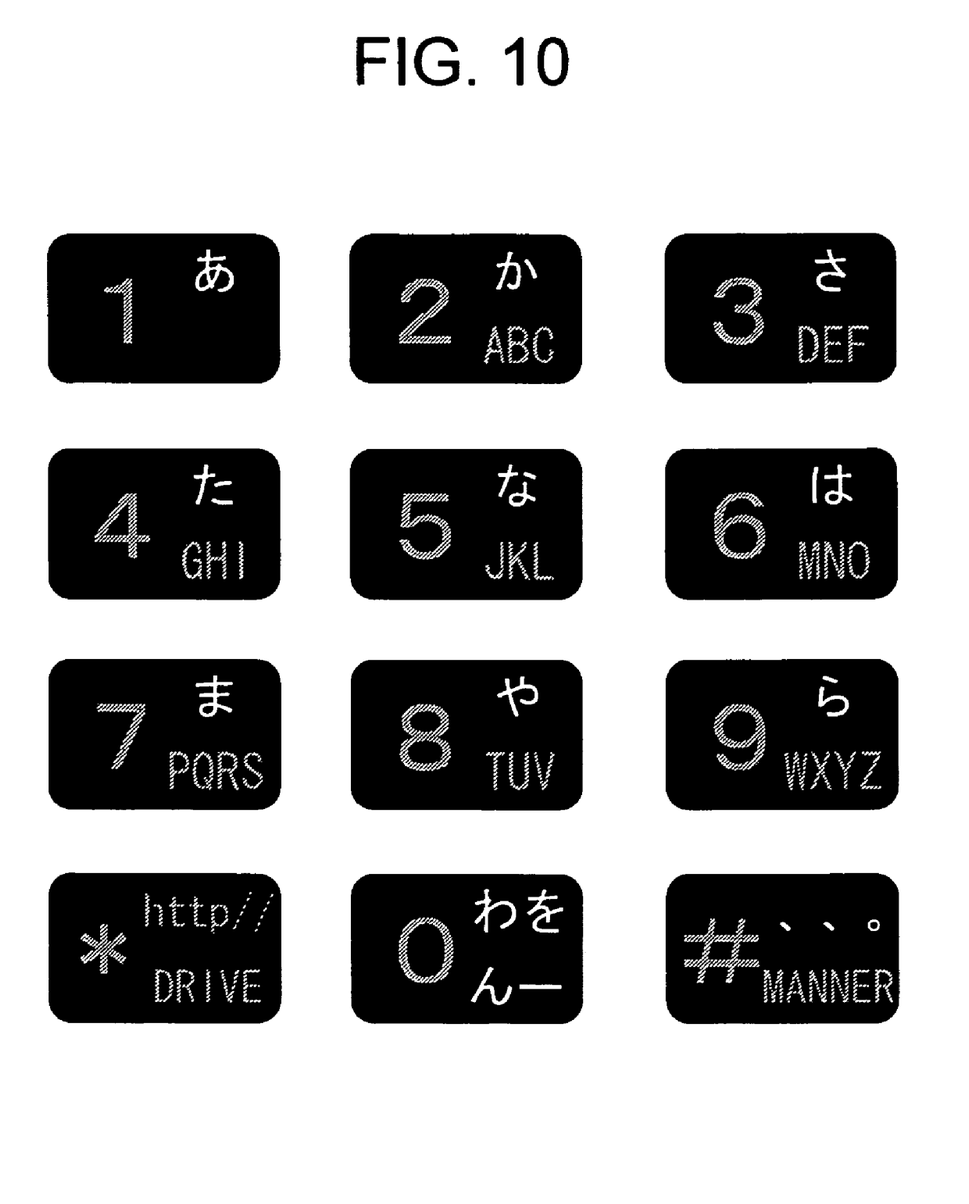
FIG. 10 is a view illustrating a displayed character in a ten-key in a kana entry mode according to one embodiment of the present invention.

If the user sets a kana entry mode (step 105), only the key backlight 6-2 for lighting a kana display area of the light shielding section 8 is lighted, and the key backlights 6-1, 6-3 for lighting a numeral display area and an alphabet display area are go off (step 106). In this case, only a character in the kana display area is lighted as illustrated in FIG. 10, and a character required in the kana entry mode is markedly lighted bright.

Figure 11:
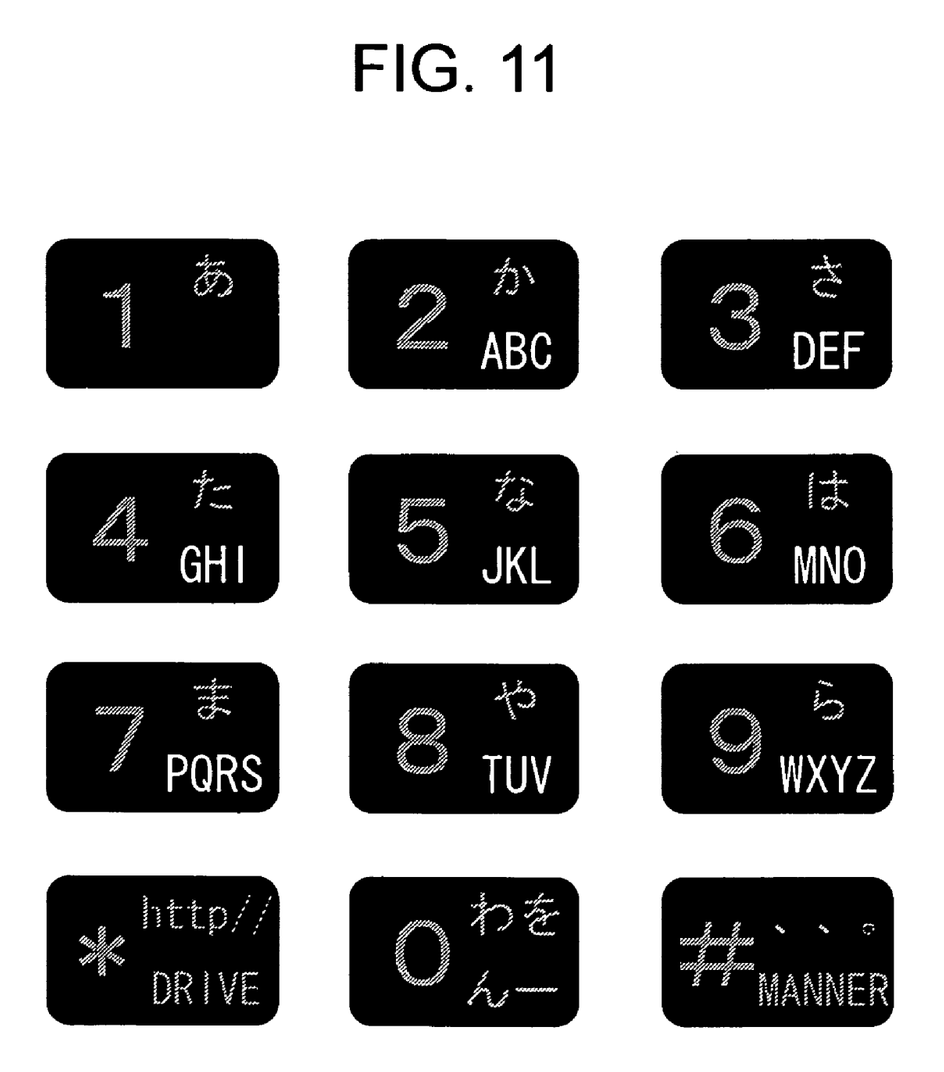

If the user sets an alphabet entry mode (step 107), only the key backlight 6-3 for lighting an alphabet display area of the light shielding section 8 is lighted, and the key backlights 6-1, 6-2 for lighting a numeral display area and a kana display area go off (step 108). In this case, only characters in the alphabet display area are lighted as illustrated in FIG. 11, and a character required in the alphabet entry mode is markedly lighted bright.

Unless any change is made in an entry mode until power is OFF in steps 201, 301, 401 ("N" in steps 202, 302, 402), lighting is continued in accordance with each mode. If any change is made in the entry mode ("Y" in steps 202, 302, 402), it moves from a coupler A to a step 103 to perform lighting control in accordance with the entry mode.

By lighting only a corresponding character display area in accordance with the entry mode preset by the user in the above way to display only a required character, visibility at a character entry can be improved.

Luminescent colors of the key backlight 6-1 for lighting a numeral display area, the key backlight 6-2 for lighting a kana display area, and the key backlight 6-3 for lighting an alphabet display area may be made different from each other.

For example, if the colors of the key backlights 6-1, 6-2, and 6-3 are taken as blue, yellowish green, and orange respectively, seeing the displayed color can identify the character type of numerals, kana characters, and alphabetical letters, thus achieving higher visibility.

The key backlights 6 are not limited to thin-film EL (electroluminescence), and for example, devices such as LED (light emitting diode) may be used.

Figure 12:
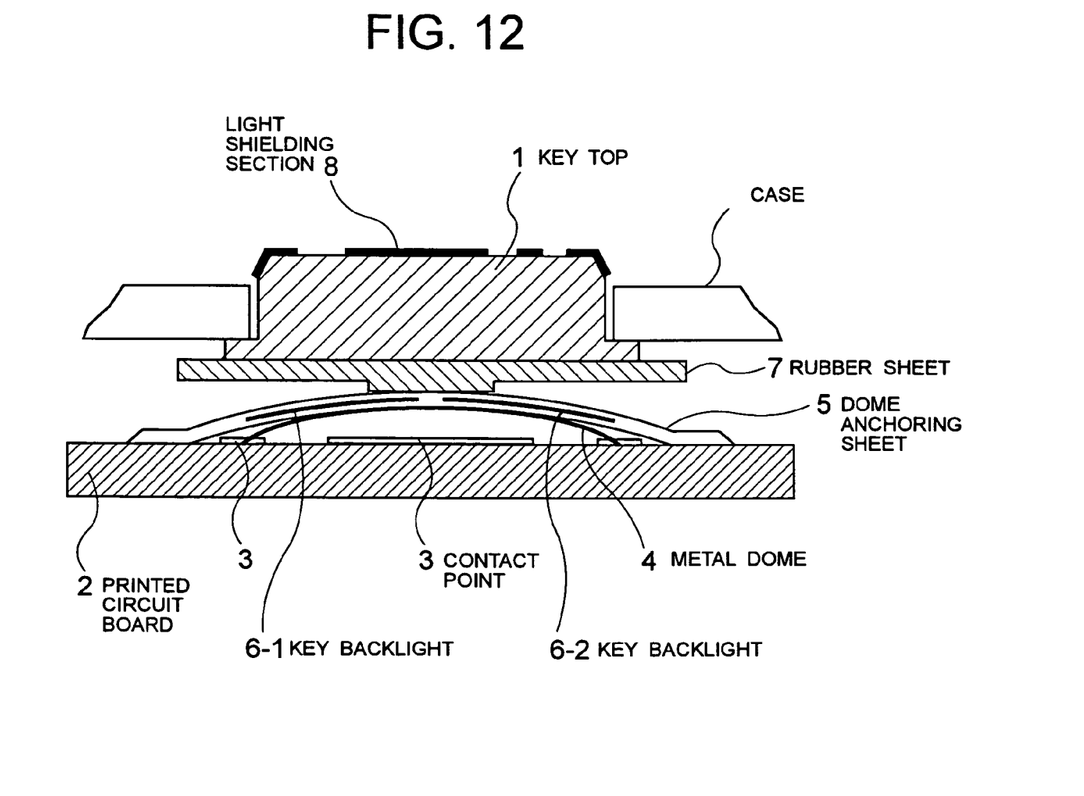
FIG. 12 is a sectional view illustrating a key button structure according to another embodiment of the present invention.

FIG. 12 is a sectional view illustrating a key button structure according to another embodiment of the present invention.

A different point of the key button structure according to one embodiment of the present invention from a key button structure illustrated in FIG. 1 is to attach the light shielding section 8 onto a surface of the key top 1. Other components are the same as those illustrated in FIG. 1, their description is omitted. Moreover, attachment of such a light shielding section onto the surface of the key top yields the same effects as in the case where the light shielding section is attached onto the rear surface. This type of key button structure, capable of being applied to such mobile phones as illustrated in FIG. 7, can perform lighting control.

In the foregoing embodiment, character arrangement of numerals, kana characters, and alphabetical letters uses the arrangements which conventional key buttons constitute as they are, however, the character arrangement may be changed for each key button without being limited to the conventional character arrangement. For example, in the case of numeral keys "7" and "9", four alphabetical letters are positioned at the right lower section, a part of which may be positioned next to kana characters and, according to the position change, the shape and arrangement of the backlight may be changed.

What is claimed is:

1. A key button structure for a portable terminal device in which a plurality of types of characters such as numerals, kana characters and alphabetical letters are respectively assigned to a key button, wherein the key button structure comprises:
   a key top made of transparent material depressed by a user;
   a light shielding section formed by reversely printing a character assigned to a key button for each character type on a face of a key top;
   an elastic metal dome brought into contact with a contact point formed on a printed circuit board by depressing a key top;
   an elastic dome anchoring sheet made of transparent material for anchoring the metal dome so as to cover the dome; and
   key backlights disposed in the dome anchoring sheet and individually lighting each of character display areas for each character type of the light shielding section,
   wherein each of the key backlights is disposed in a portion of the dome anchoring sheet independent of each of the other key backlights.

2. The key button structure according to claim 1, wherein the key backlights are subjected to lighting control in accordance with a preset entry mode.

3. The key button structure according to claim 1, wherein the key backlights perform lighting in a different color for every character display area.

4. The key button structure according to claim 1, wherein the light shielding section is formed on a front face of the key top.

5. The key button structure according to claim 1, wherein the light shielding section is formed on a rear face of the key top.

* * * * *